(12) United States Patent
Fiore

(10) Patent No.: US 8,690,188 B2
(45) Date of Patent: Apr. 8, 2014

(54) CHILD SEAT WITH INFLATABLE CHILD RESTRAINT

(75) Inventor: Francis M Fiore, Bruce, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 2 days.

(21) Appl. No.: 13/569,240

(22) Filed: Aug. 8, 2012

(65) Prior Publication Data
US 2014/0042793 A1    Feb. 13, 2014

(51) Int. Cl.
| B60R 21/18 | (2006.01) |
| A62B 35/00 | (2006.01) |
| B60R 21/26 | (2011.01) |
| B60R 22/10 | (2006.01) |
| B60R 22/30 | (2006.01) |

(52) U.S. Cl.
USPC .................. 280/733; 297/250.1; 297/484

(58) Field of Classification Search
USPC .......... 280/733; 297/250.1, 216.11, 484, 483, 297/485
See application file for complete search history.

(56) References Cited

U.S. PATENT DOCUMENTS

| 3,934,934 A | * | 1/1976 | Farrell et al. .................. 297/467 |
| 4,342,483 A | * | 8/1982 | Takada ........................... 297/488 |
| 4,711,490 A | * | 12/1987 | Brand .......................... 297/250.1 |
| 4,834,420 A | * | 5/1989 | Sankrithi et al. ............ 280/728.1 |
| 5,292,175 A | * | 3/1994 | Artz ............................. 297/250.1 |
| 5,368,328 A | * | 11/1994 | Kamiyama et al. ............. 280/733 |
| 5,413,377 A | * | 5/1995 | Kamiyama et al. ............. 280/733 |
| 5,720,519 A | * | 2/1998 | Barnes .......................... 280/737 |
| 5,779,304 A | * | 7/1998 | Cunningham ........... 297/216.11 |
| 5,791,739 A | * | 8/1998 | Lewis ............................. 297/471 |
| 6,062,596 A | * | 5/2000 | Boydston et al. ............. 280/733 |
| 6,237,999 B1 | * | 5/2001 | Hobson .................... 297/256.15 |
| 6,736,455 B1 | * | 5/2004 | Zakovic et al. .......... 297/256.15 |
| 7,232,182 B2 | * | 6/2007 | Yoshida ................... 297/216.11 |
| 7,293,828 B2 | * | 11/2007 | Yoshida ................... 297/216.11 |
| 8,517,418 B2 | * | 8/2013 | Schondorf et al. ............. 280/733 |
| 2013/0001938 A1 | * | 1/2013 | Schondorf et al. ............. 280/741 |

FOREIGN PATENT DOCUMENTS

WO    WO 2009155534 A1 * 12/2009

* cited by examiner

*Primary Examiner* — Karen Beck
(74) *Attorney, Agent, or Firm* — Markell Seitzman

(57) ABSTRACT

A restraint seat for use in vehicles with restraint systems having inflation devices is disclosed; the seat has a seat body housing, a seat body attachment means for securing the seat to a vehicle seat assembly, the seat body means securable to the seat body and a child restraint harness affixed to the seat body housing for restraining a child. The child restraint harness includes one or more inflatable belts. The harness is connectable to the vehicle restraint system which includes an inflation device, wherein the actuation of the vehicle inflation device inflates the one or more inflatable belts of the child seat. The harness further has a tongue for connecting the harness of the child seat to the buckle of the vehicle restraint system.

17 Claims, 4 Drawing Sheets

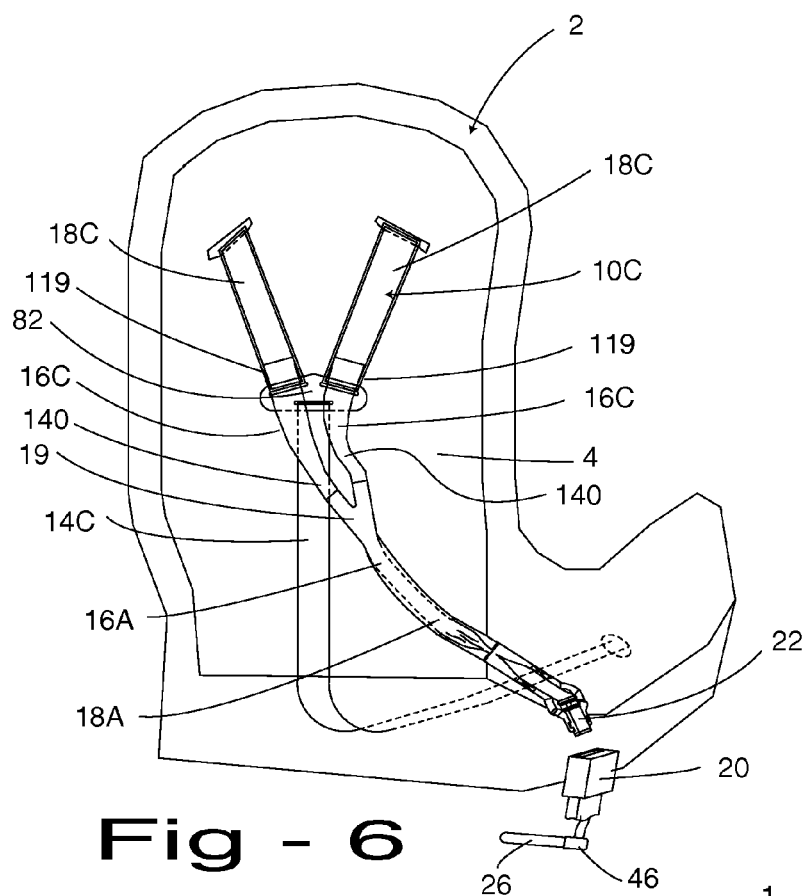
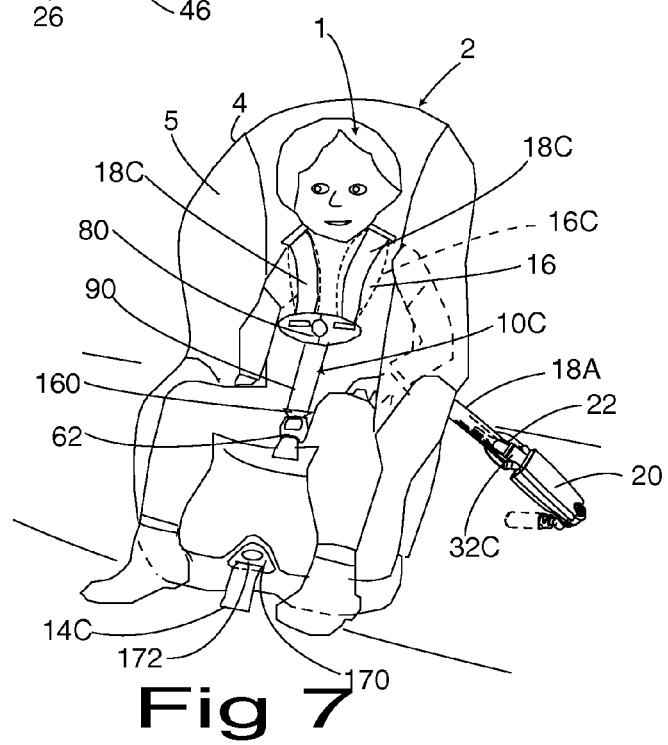

CHILD SEAT WITH INFLATABLE CHILD RESTRAINT

FIELD OF THE INVENTION

This invention relates to a child restraint seat and, more particularly, to a child seat with a restraint harness having one or more inflatable belts.

BACKGROUND OF THE INVENTION

Several vehicle manufacturers have added or have proposed seat belt restraint systems for adult size occupants, with inflatable shoulder harness belts or inflatable lap belts or a combination of belts. One such inflatable belt system is disclosed in WO2009/155534A1 an "Inflatable Seat Belt System" the contents of which are incorporated herein in their entirety. In that seat belt system, the buckle includes a flow-through passage, and the tongue includes a complementary flow-through passage, the flow-through passage in the tongue is connected to an inflatable air bag that is located in the shoulder belt portion of the system. Upon insertion of the tongue into the buckle, the passages are aligned. Upon activation of an air bag inflator, inflation gases pass through the buckle into the tongue, then into the inflatable belt. Other systems also provide a flow-through passage formed adjacent the lock plate of the tongue and shown in U.S. Pat. No. 6,591,465 which is incorporated herein in its entirety.

In regard to a child seat a similar inflatable belt configuration with a dedicated inflator can also be used. However, if the child seat is a removable one, the inflator, as well as other components which are part of the child seat, could be subject to misuse when the child seat is removed and stored outside of the vehicle. Separately, when child or toddler seats are employed to hold a child, the child seat restraint manufacturers recommend disabling the inflatable seat belt system designed to protect the adult. As a result, the child seat does not have the benefits of an in-vehicle inflatable seat belt system.

The present invention provides a solution to this problem and provides an inflatable seat belt harness which is a part of the child seat that can be directly connected to an existing buckle of an in-vehicle restraint system to safely allow inflation of a child seat harness integral to a child restraint seat without the need of requiring the inflator to be part of the child seat.

SUMMARY OF THE INVENTION

A child restraint seat for use in vehicles with restraint systems having inflation devices is disclosed. The child seat has a seat body housing and a child restraint harness. The child restraint harness includes one or more inflatable belts associated with the harness. One of the inflatable belts of the harness includes another tongue that is connectable to the buckle of the used in the existing vehicle inflatable restraint system, for example one such the buckle can be the buckle shown in WO2009/155534A1 or alternatively the buckle shown in U.S. Pat. No. 6,591,465 which is incorporated herein in its entirety. In this US patent, the tongue used with the child seat would include a gas tube positioned adjacent the latch plate of the tongue to be compatible with the buckle described therein. The child seat does not require any sensors as these are part of the vehicle safety system. During an accident, the inflator of the vehicle safety system is active and inflation gas is provided to the child seat through the buckle-tongue connection.

Harnesses for existing child seats will often have three belts or straps, that is two shoulder belts and one crotch belt or have five belts or straps, that is two shoulder belts and one crotch belt and two leg belts. In a child seat with an inflatable harness, the shoulder belts and perhaps the leg belts or straps would tend to be inflated.

In one embodiment, the harness has two inflatable belts, one extending from each shoulder portion of the seat body for connection to the center strap to form a 3-point attachment restraint harness. The two inflatable seat belts extend from the back side of the seat housing where each inflatable belt connects to the buckle of the vehicle inflatable restraint system via an inflation tube allowing the inflation tube to provide inflation to the two inflatable belts.

The child seat may be removable or part of a vehicle seat. The child seat also may be forward facing for older or larger children.

BRIEF DESCRIPTION OF THE DRAWINGS

The invention will be described by way of example and with reference to the accompanying drawings in which:

FIG. 6 is a rear view of the child restraint seat of FIG. 5 showing the restraint harness affixed to the body structure;

FIG. 7 is a perspective view of the child seat of FIG. 5 with a child wherein the dashed lines of the shoulder belt show the inflated belts;

DETAILED DESCRIPTION OF THE INVENTION

FIGS. 1 through 4 are illustrations of a typical vehicle inflatable seat belt restraint system used in a vehicle and more particularly shown in WO2009/155534A1. This exemplary system is shown and described to illustrate how such a system can be used in combination with a child restraint seat having an inflatable seat belt harness to provide enhanced protection for the child. This exemplary vehicle system is simply one example of such a system. There are many alternative systems available for example, as previously mentioned, U.S. Pat. No. 6,591,465 shows another vehicle inflatable seat belt restraint system. The important feature is that a child restraint seat can be provided to compatibly use the vehicle's pre-existing air bag inflation system and in particular the pre-existing buckle and inflator.

Figure 1:
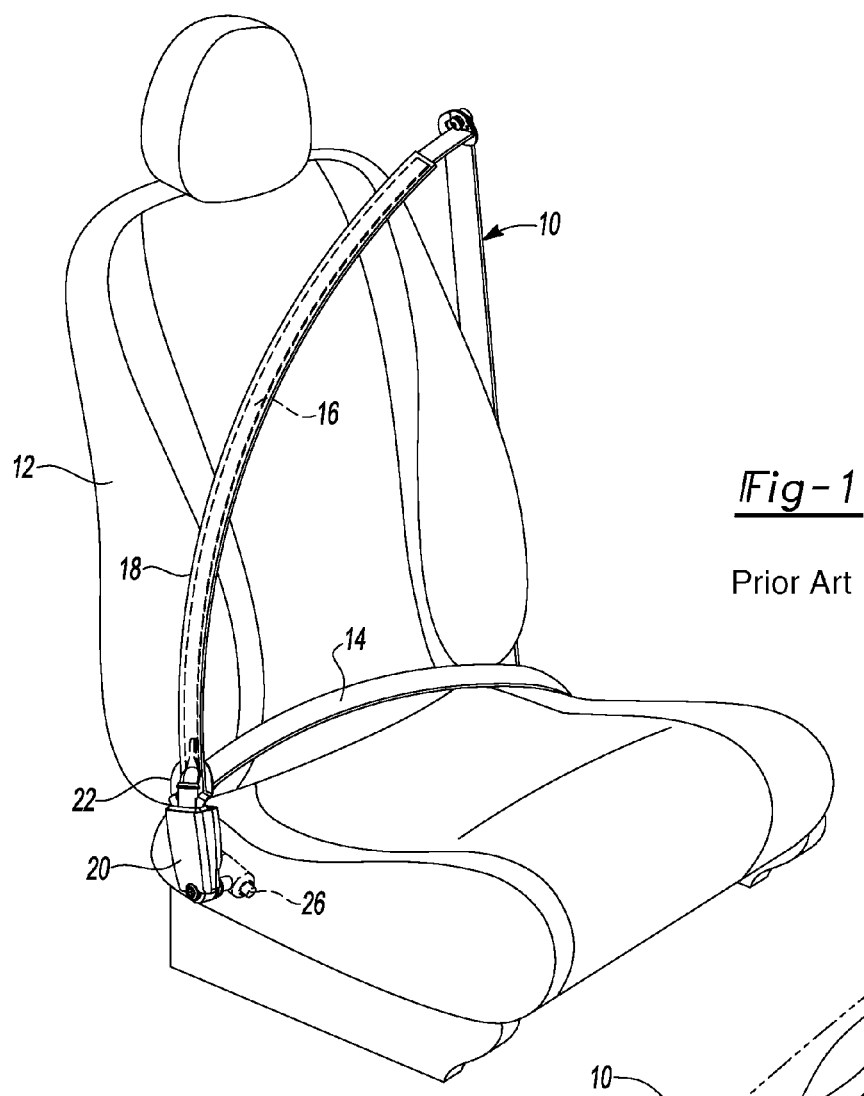
FIG. 1 is a perspective view of an exemplary vehicle seat including a seat belt harness with an inflatable member disposed in the shoulder belt.

Referring to FIG. 1, a vehicle seat belt harness 10 is shown in its latched position extending across a vehicle seat 12 in a configuration achieved when positioned about an occupant (not shown). The seat belt harness 10 includes a lap belt 14 and an inflatable member 16, or air bag, in its uninflated condition within a shoulder belt 18. As can be appreciated at least a portion of the shoulder belt is hollow to receive the air bag. The lap belt 14 and shoulder belt 18, in the above system, are attached to retractors that retract the belts when not in use as is well known in the art. An anchor such as buckle 20 is secured to the seat 12 and the seat belt harness 10 is secured to the buckle 20 by a belt anchor such as tongue assembly 22. An inflator 26 is shown which is connected to the buckle 20. The inflation function can be achieved by a wide variety of air bag inflators. In this embodiment a cold gas inflator 26 is used. The inflator has compressed gas in a cylinder which is released by a pyrotechnic initiator.

Figure 2:
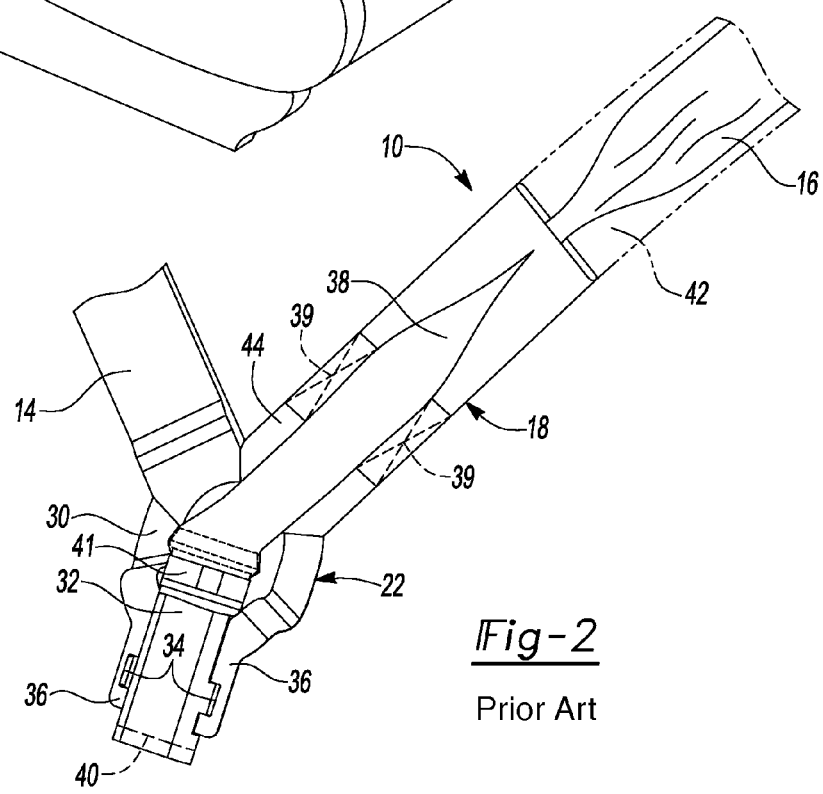
FIG. 2 is a fragmentary elevation view of the exemplary seat belt harness with an inflatable member disposed within the shoulder belt shown connected at a tongue to a buckle of the vehicle.

Referring to FIG. 2, the vehicle seat belt harness 10 and tongue assembly 22 are shown in greater detail. The lap belt 14 and shoulder belt 18 are secured to the belt tongue 22. The tongue 22 includes a tongue tube 32 that is received by the buckle 20. The tongue assembly includes a loop 30 that may be secured to the tongue 22 by welding, braising or by another joining technique. The lap belt 14 and shoulder belt 18 are secured to the loop 30. The tongue 22 includes a tubular body 32. A pair of latch openings 34 is provided in flanges 36 that extend outwardly from the tubular body 32 on opposite sides of the tubular body 32. An inlet tube 38 of the inflatable member 16 is connected to the tubular body 32. Inflation gas flows through the tubular body 32 to the inlet tube 38 and into the air bag when a collision is detected and the inflator activated. In the illustrated embodiment the inflatable member 16 is received in a hollow belt 42. The ends 44 of the hollow belt 42 are split. As can be appreciated, the tongue is designed to be secured to the particular buckle used in the system.

The inlet tube 38 of the tongue is secured to the hollow belt 42 by looping the ends 44 through the loop and sewing each end to itself. Securing the ends 44 of the belt 42 to the tongue lessens the stress on the inlet tube and air bag. The tube 38 is secured about an end of the tubular body by a clamp 41.

Figure 3:
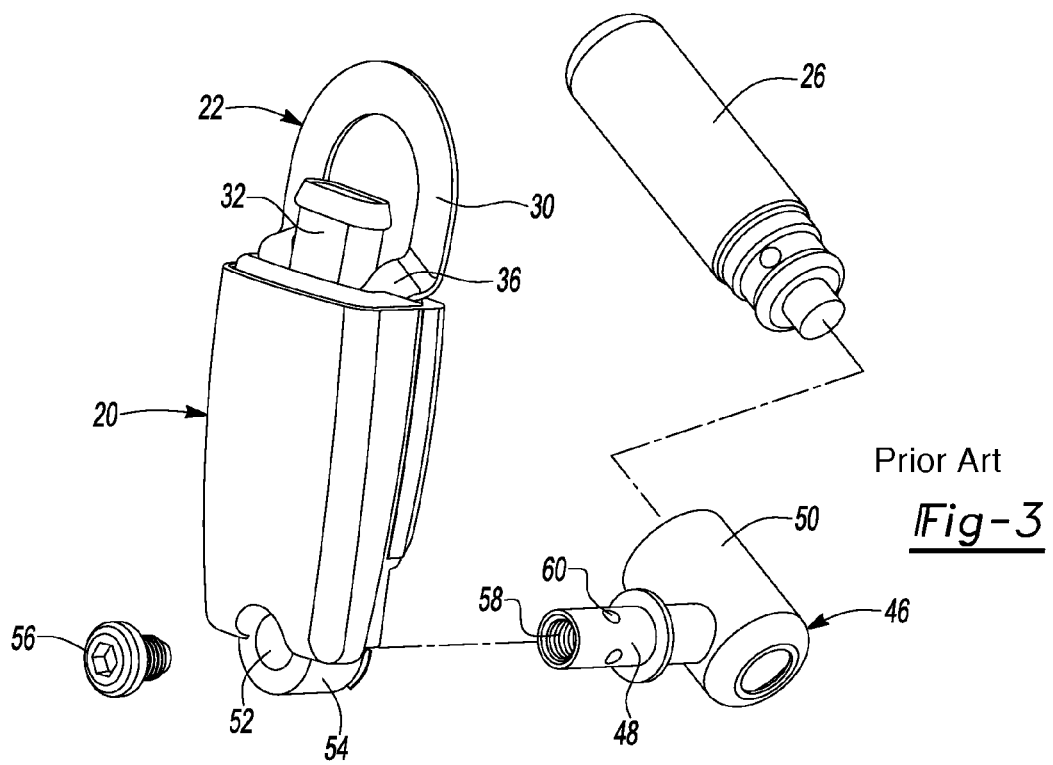
FIG. 3 is an outer perspective view of a latch with the belt tongue inserted and a compressed gas cylinder and diffuser exploded from the buckle.
Figure 4:
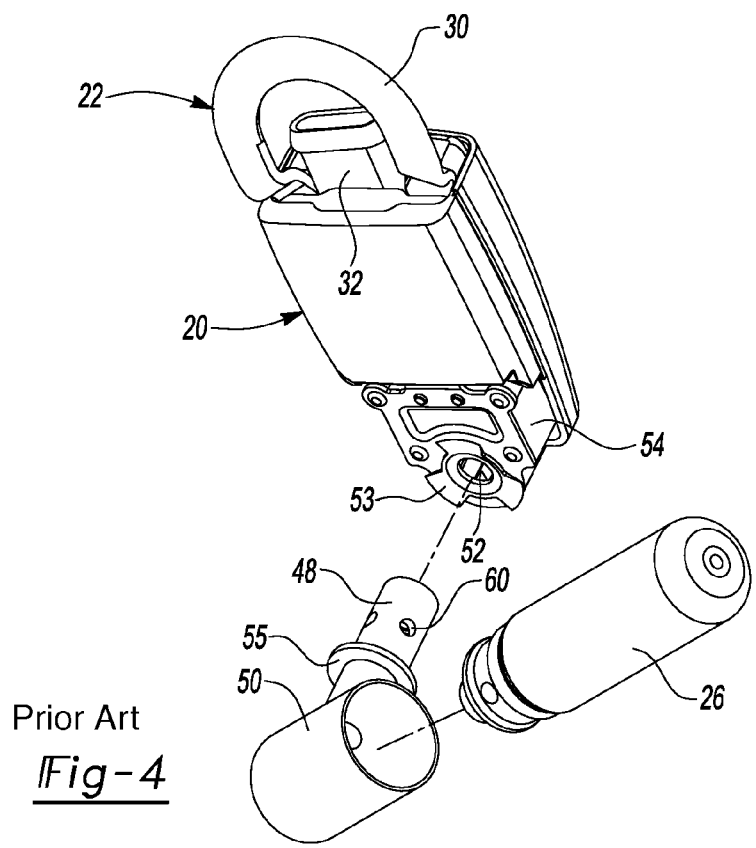
FIG. 4 is an inner perspective view of a buckle with the tongue inserted and the compressed gas cylinder and diffuser exploded from the buckle.

Referring to FIGS. 3 and 4, the buckle 20 and tongue assembly are shown with inflator 26 separated from the buckle 20. The inflator 26 ports compressed gas through a conduit 48 in a collision. The use of a conduit permits the inflator to be mounted remote from the buckle. However, the inflator can be secured directly into the buckle. A receptacle 50, which is also referred to as a diffuser herein, receives the inflator 26 and is connected to the conduit 48. The buckle includes a housing or manifold 54 with an opening 52 that receives the conduit 48. The housing 54 includes a housing or diffuser seal 53 that bears upon a ring 55 that is secured to or formed about the conduit 48 to prevent gas from exiting the housing 54 through the opening 52. A fastener 56 is received in a threaded inner diameter 58 of the conduit 48 to secure the conduit 48 within the housing 54. A plurality of gas outlet ports 60 is provided in the conduit 48 to open into the housing 54 and dispel gas into a cavity defined by the housing 54.

The tongue 22 may include an assembled plastic seal 40, see FIG. 1, placed at or near the distal end of the tubular body 32. The end of the tongue 22 may be beveled for guiding the seal into the tubular body 32. The seal prevents liquid and debris from entering the tubular body 32. The seal 40 can be mounted on the lower edge 41 of the tubular body 32 or placed within the tubular body to form the sealing surface. The seal may be formed of a plastic seal material. In the illustrated embodiments of the child seat, it is this tongue that is part of the child seat harness.

Figure 8:
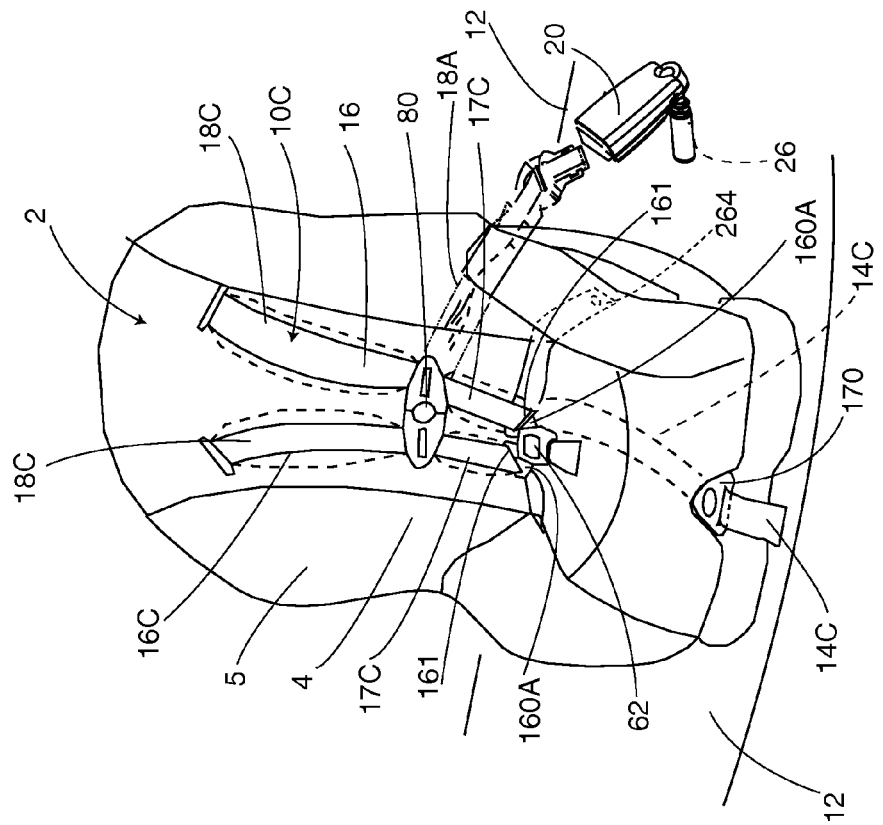
FIG. 8 is a front perspective view of an alternative embodiment child restraint seat of the present invention shown with a 5-point restraint harness configuration.
Figure 5:
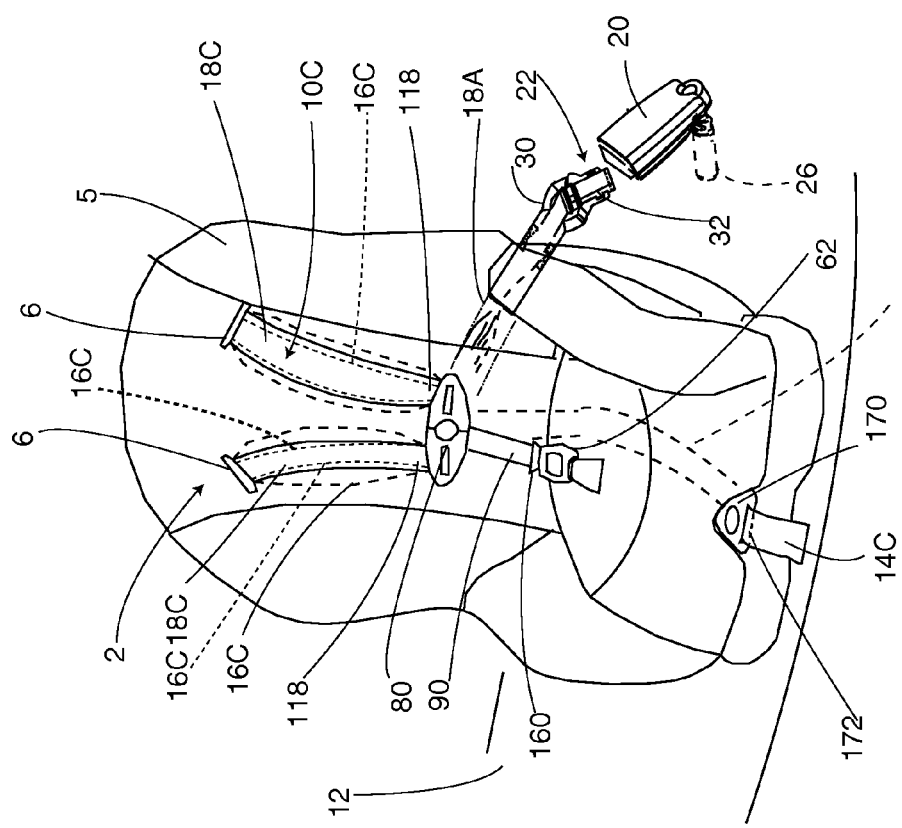
FIG. 5 is a front perspective view of the child restraint seat of the present invention shown with a 3-point restraint harness configuration, the dashed lines representing the inflated belts when the inflation system is activated.

In the prior art, the exemplary vehicle restraint system was disabled or not used when a child restraint seat was being used. The child restraint seat 2 for use in vehicles with restraint systems overcomes this issue by providing a child restraint harness 10C with inflatable air bags. The harness 10C replicates a conventional child seat. For example, the harness 10C of FIG. 5 is configured as a 3-point child restraint system in which the harness 10C of FIG. 8 is configured as a 5-point child restraint system. Other harness variations are within the scope of the present invention. The child restraint harness 10C includes an additional tongue 22 that is configured to connect directly to the buckle 20 of the vehicle restraint system which enables inflation gas from the existing inflator to be transmitted from the buckle 20, through this additional tongue 22, to the air bags within the harness 10C. In this manner, the child seat 4 need not include any of the complex crash sensors and inflator normally associated with air bag systems. In this way, the toddler or small child can be provided the added protection of an inflatable seat belt harness 10C that is specifically designed and sized for the child, but without the added cost and complexity of having to separately duplicate all the required inflation sensors and devices already installed in the vehicle.

As shown in FIG. 5, a child restraint seat 2 for use in vehicles with restraint systems having inflation devices is disclosed. The seat 2 has a seat body housing 4; seat body attachment mechanisms can be provided securing the seat 2 to a vehicle seat assembly and a child restraint harness 10C. These attachment mechanisms are not shown as they are well known and not part of the present invention. The child restraint harness includes a number of seat belts configured in various known configurations for the protection of the child. As will be seen, to accommodate an inflatable member 10C such as an air bag, some of these seat belts can be hollow throughout or hollow in one or more sections. Those familiar with the art of seat belt weaving will know seat belts can be woven as a hollow tube or woven with a conventionally woven section which transitions to a hollow section and, if needed, this hollow section can transition back to a second conventionally woven section. The hollow section is configured to receive an air bag, which inflates in a similar manner to that as described in FIGS. 1-4. The tubular seat belt is designed to tear open as the air bag inflates; as such these types of seat belts are referred to in the art as inflatable belts.

The child restraint harness of FIG. 5 is configured as a 3-point harness with two shoulder belts 18C. Each shoulder belt has a first end 118 secured to a breast plate connector 80. The breast belt connector or breast plate can be replaced by a buckle and tongue arrangement which secures the shoulder belts together in a known manner. Each shoulder belt extends from the front of the seat through an opening 6 to the rear of the seat 2. Second ends 119 of the belts 18C are configured to be affixed securely to a back plate 82 or equivalent. Each shoulder belt 18C is hollow in its middle section to accommodate an inflatable air bag 16C. In FIG. 5, each air bag 16C is shown in a stored condition in a belt 18C and in an inflated condition as shown by an associated phantom line. To facilitate attachment of each end of a shoulder belt 18C to a plate, these ends can be woven or sewn together forming a conventional seat belt. The harness 10C is connectable directly to the pre-existing vehicle restraint system with the inflation device using the above-mentioned tongue 22, wherein the actuation of the inflation device of the vehicle restraint system inflates the one or more air bags 16C.

As shown in FIG. 5, the child restraint seat 2 is configured to be virtually identical to all the well established and tested safety features of child restraint seats including a lightweight seat body housing 4 with padded cushioning 5 with padded side supports so the child 1 is nested firmly in the seat and secured by the three-point harness 10C (see FIG. 7).

In normal usage, the child restraint seat 2 is functionally identical to a conventional child seat, but with a very unique benefit of having an inflatable belt assembly. The breast plate 80 is connected to a child seat tongue 160, of conventional design, using a length of seat belt material 90. The tongue 160 is connected to a conventional child seat buckle 62. Also shown in FIGS. 5, 6 and 7 the child seat includes a center or tightening belt 14C which extends from the rear plate 82, under the child seat and exits a slot 172 in a clamp 170, also of known construction. By pulling on the belt 14C, the harness 10C can be tightened about the child. If clamp 170 is released the harness can be loosened about the child. As previously mentioned the belt harness 10C has both of the shoulder belts 18C extending through to the rear of the child seat. The ends 119 of the belts 18C are affixed securely to back plate 82 to avoid transferring tensional forces to the air bags. The shoulder belts 18C simply move through the slots 6 in the seat body 4 as the harness is loosened or tightened. The air bags need not be so secured to the back plate 82. Each air bag includes an inlet 140 characteristic of an air bag.

As shown in FIG. 7 the shoulder belts pass through slots 6 in the housing body 4 to allow the shoulder belts 18C to overlay the child's shoulders. The head, neck and upper torso of the child is being positioned between the shoulder belts 18C. The breast plate 80 or equivalent keeps these belts in proper alignment to prevent the child 1 from slipping between the belts 18C. Once latched, the child 1, shown in FIG. 7, is secured firmly into the seat body 4. This is typical and not particularly different from any conventional seat. With regard to the embodiment of FIG. 5, each air bag 16 is slid inside a respective shoulder belt from a location near end 119. If needed the hollow seat belt 18C can be slit to enlarge the effective opening presented by the hollow seat belt to permit easy entry of the air bag. A non-inflating border portion of the bag may be stitched to the seat belt near end 118 to keep the air bag in place within the shoulder belt 18C.

As shown in FIGS. 6-8, the harness 10C has an attachment belt 18A with a tongue 22 configured as shown in FIG. 2. The tongue connects to the buckle 20 of the vehicle restraint system shown in FIGS. 1, 3 and 4.

The rear side of the child seat 2 is shown in FIG. 6. The attachment belt 18A is secured to the loop of the tongue in the manner as shown and discussed relative to FIG. 2. In the illustrated embodiment, the attachment belt 18A is a hollow sleeve of seat belt material with a gas carrying tube 16A connected to the tongue tube 32 and secured by a clamp 41 in the same manner as is the tongue 22 of the vehicle restraint system. This tube 16A is connected to a "Y" shaped flow splitter 19, as shown in FIG. 6, that forms two separate air paths which are connected to the two inlets 140 of each air bag 16C respectively located in each of the shoulder belts 18C. In the event of an accident, the inflator 26 ignites and pressurizes the air bags 16C inflating each shoulder belt 18C as depicted by the dashed lines in FIGS. 5, 7 and 8, showing the expansion of each shoulder belt 18C. At this point the child 1 in the seat 2 is provided the safety benefit of the vehicle restraint system that was previously restricted to adult passengers and was heretofore disabled for the toddler or small child. The present invention child seat provides a reliable proven technology available in the vehicle to be used in a safe manner with a child restraint seat having an inflatable harness 10C.

In this embodiment when the attachment belt 18A and tube 16A are connected to the tongue 22 and the tongue 22 is connected to the vehicle buckle 20 there is provided sufficient slack so that the attachment belt 18A, tube 16A and "Y" connector 19 never are pulled or stretched under any load or force in the event of an accident. The loads at the inflatable shoulder belts 18C above the back plate 82 to which they are affixed and the center belt 14 absorb all the loads exerted by the child while the child restraining seat 2 is conventionally attached to the vehicle seat at the attachment locations normally provided in vehicle seats for this purpose. As noted, these prior art seat attachment means are not illustrated as they form no part of the claimed invention and are well known in the prior art.

With reference to FIG. 8, an alternative embodiment child restraint seat 2 is shown wherein the harness 10C further has the shoulder belts 18C, with air bags 16C inside. The shoulder belts can terminate at the breast plate or extend through one of two conventional split tongues 160A, each of which includes an opening 161. Each split tongue is lockingly received in a conventional buckle 262. Thereafter the belt 18C can extend to a terminal end 264 which is secured to the seat 2. That portion of the belt extending from the tongue 160A to the terminal end 254 is also referred to as a leg strap 17C. Each air bag 16C can extend through the entire length of the shoulder belt 18C or any portion thereon. Upon inflation the air bags 16C are inflated. In the illustration, this 5-point harness is functionally identical to that of the 3-point harness in all other respects. In this embodiment it would be possible to inflate that portion of the shoulder belt above the breast plate, as well as that portion of the shoulder belt below the breast plate or even the leg straps 17C which, as can be appreciated, are an extension of the shoulder belt 18C. In the illustrated embodiment the air bags 16C are inflated from the rear of the child seat in the manner described above. The direction of gas flow is from the rear plate, through the shoulder belt. Alternatively, it would be possible to inflate the leg straps 17C first and then those other portions of the shoulder belts 18C by having the attachment belt 18A, "Y" connector 19 affixed to the underside of the seat bottom of seat body 4 and connected to the leg straps 17C and to the air bag located in the leg belts 17C. In this manner the opposing ends of the air bags within the shoulder belts would be closed to air flow.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A child restraint seat comprising:
   a child restraint harness for restraining a child, the child restraint harness including one or more belts (18C) configured to be placed about and restraining the child, and an air bag located within the one or more belts which when activated by inflation gas assist in restraining the child, the air bag operationally configured to fluidly connect with an inflation device external to the child restraint seat, wherein the actuation of the inflation device inflates at least one air bag of the child restraint seat.

2. The child restraint seat according to claim 1 wherein the inflation device external to the child restraint seat is associated with a vehicle restraint system of a vehicle into which the child restraint seat is to be mounted.

3. The child restraint seat according to claim 1 wherein the harness includes a plurality of shoulder belts, each shoulder belt associated with an air bag.

4. The child restraint seat according to claim 2 wherein the harness has a belt with an inflation tube therein extending from the tongue, the inflation tube connected to one or more inflatable belts.

5. The child restraint seat according to claim 1 wherein the harness has two inflatable air bags with corresponding woven belts, each woven belt configured to be placed about the shoulder of a child to be protected, wherein the harness is configured as a 3-point attachment restraint harness.

6. The child restraint seat according claim 5 wherein the two inflatable air bags extend to a back side of a seat housing where each air bag is connected to an inflation tube forming a Y connection allowing the inflation tube to provide inflation gases to both air bags.

7. The child restraint seat according claim 6 wherein the harness includes a center or crotch belt.

8. The child restraint seat according claim 7 wherein the harness comprises two leg belts, wherein the leg belts connect to the crotch belt.

9. The child restraint seat according claim 7 wherein the leg belts are inflatable.

10. The child restraint seat according claim 1 wherein the child seat is removable.

11. The child restraint seat according claim 10 wherein the child seat is forward facing.

12. The child restraint seat according to claim 2 wherein the vehicle restraint system includes a first buckle in fluid communication with the one inflation device and wherein the harness includes a first tongue configured to be connected with and be in fluid communication with the first buckle of the vehicle restraint system.

13. The child restraint seat according to claim 1 wherein the child restraint seat has no separate source of inflation gas.

14. The child restraint seat according to claim 1 wherein the child restraint seat includes one or more surfaces to support that child.

15. A child restraint seat for use in a vehicle having a restraint system with at least one inflation device, the child seat comprising:
 a child restraint harness for restraining a child, the child restraint harness including one or more belts (18C) configured to be placed about and restraining the child, and an air bag located within the one or more belts, the air bag operationally configured to connect with the inflation device of the vehicle restraint system, wherein the actuation of the inflation device of the vehicle restraint system inflates at least one air bag, wherein the two inflatable air bags extend to a back side of a seat housing where each air bag is connected to an inflation tube forming a Y connection allowing the inflation tube to provide inflation gases to both air bags.

16. The child restraint seat according claim 15 wherein the harness includes a center or crotch belt.

17. The child restraint seat according claim 16 wherein the harness comprises two leg belts, wherein the leg belts connect to the crotch belt.

* * * * *